(12) United States Patent
Patel et al.

(10) Patent No.: US 10,235,059 B2
(45) Date of Patent: Mar. 19, 2019

(54) TECHNIQUE FOR MAINTAINING CONSISTENT I/O PROCESSING THROUGHPUT IN A STORAGE SYSTEM

(71) Applicant: NetApp, Inc., Sunnyvale, CA (US)

(72) Inventors: Chaitanya Patel, Morrisville, NC (US); Shailesh Ajay Shiwalkar, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 30 days.

(21) Appl. No.: 14/955,973

(22) Filed: Dec. 1, 2015

(65) Prior Publication Data

US 2017/0153829 A1    Jun. 1, 2017

(51) Int. Cl.
*G06F 11/00* (2006.01)
*G06F 3/06* (2006.01)
(Continued)

(52) U.S. Cl.
CPC ............ *G06F 3/0619* (2013.01); *G06F 3/061* (2013.01); *G06F 3/065* (2013.01); *G06F 3/0688* (2013.01);
(Continued)

(58) Field of Classification Search
CPC .... G06F 11/2094; G06F 3/0619; G06F 3/065; G06F 3/0689; G06F 2201/84; G06F 2201/805
(Continued)

(56) References Cited

U.S. PATENT DOCUMENTS 5,138,697 A * 8/1992 Yamamoto ............. G06F 17/50
345/420
5,459,857 A   10/1995 Ludlam et al.
(Continued)

OTHER PUBLICATIONS

Enclopedia entry for pointers vs. references, retrieved from: https://www.geeksforgeeks.org/pointers-vs-references-cpp/ on Dec. 23, 2017.*
(Continued)

*Primary Examiner* — Yair Leibovich
(74) *Attorney, Agent, or Firm* — Cesari and McKenna, LLP

(57) ABSTRACT

A technique maintains consistent throughput of processing of input/output (I/O) requests by a storage system when changing configuration of one or more Redundant Array of Independent Disks (RAID) groups of storage devices, such as disks, within the storage system. The configuration of a RAID group (i.e., RAID configuration) may be represented by RAID objects (e.g., reference-counted data structures) stored in a memory of the storage system. Illustratively, the RAID objects may be organized as a RAID configuration hierarchy including a top-level RAID object (e.g., RAID group data structure) that is linked (e.g., via one or more pointers) to one or more intermediate-level RAID objects (e.g., disk and segment data structures) which, in turn, are linked to one or more low-level RAID objects (e.g., chunk data structures). According to the technique, a snapshot of a current RAID configuration (i.e., current configuration snapshot) may be created by incrementing a reference count of the current top-level object of the hierarchy and attaching (e.g., via a pointer) the current configuration snapshot to a current I/O request processed by the storage system.

20 Claims, 11 Drawing Sheets

(51) Int. Cl.
*G06F 11/20* (2006.01)
*G06F 11/36* (2006.01)

(52) U.S. Cl.
CPC ............ *G06F 3/0689* (2013.01); *G06F 11/00* (2013.01); *G06F 11/2094* (2013.01); *G06F 11/3668* (2013.01); *G06F 2201/805* (2013.01); *G06F 2201/84* (2013.01)

(58) Field of Classification Search
USPC ...................................................... 714/6.22
See application file for complete search history.

(56) References Cited

U.S. PATENT DOCUMENTS

| | | |
|---|---|---|
| 5,937,425 A | 8/1999 | Ban |
| 6,219,800 B1 | 4/2001 | Johnson et al. |
| 6,578,158 B1 | 6/2003 | Deitz et al. |
| 7,047,358 B2 | 5/2006 | Lee et al. |
| 7,249,150 B1 | 7/2007 | Watanabe et al. |
| 7,603,529 B1 | 10/2009 | MacHardy et al. |
| 7,680,837 B2 | 3/2010 | Yamato |
| 7,831,769 B1 | 11/2010 | Wen et al. |
| 7,996,636 B1 | 8/2011 | Prakash et al. |
| 8,082,390 B1 | 12/2011 | Fan et al. |
| 8,099,396 B1 | 1/2012 | Novick et al. |
| 8,140,860 B2 | 3/2012 | Haswell |
| 8,156,290 B1 | 4/2012 | Vanninen et al. |
| 8,205,065 B2 | 6/2012 | Matze |
| 8,209,587 B1 | 6/2012 | Taylor et al. |
| 8,341,457 B2 | 12/2012 | Spry et al. |
| 8,417,987 B1 | 4/2013 | Goel et al. |
| 8,495,417 B2 | 7/2013 | Jernigan, IV et al. |
| 8,539,008 B2 | 9/2013 | Faith et al. |
| 8,560,879 B1 | 10/2013 | Goel |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,732,426 B2 | 5/2014 | Colgrove et al. |
| 8,775,868 B2 | 7/2014 | Colgrove et al. |
| 8,832,373 B2 | 9/2014 | Colgrove et al. |
| 2002/0073354 A1 | 6/2002 | Schroiff et al. |
| 2002/0188711 A1 | 12/2002 | Meyer et al. |
| 2003/0120869 A1 | 6/2003 | Lee et al. |
| 2003/0191916 A1 | 10/2003 | McBrearty et al. |
| 2004/0133742 A1 | 7/2004 | Vasudevan et al. |
| 2005/0144514 A1 | 6/2005 | Ulrich et al. |
| 2005/0177770 A1 | 8/2005 | Coatney et al. |
| 2007/0143359 A1 | 6/2007 | Uppala |
| 2007/0234106 A1 | 10/2007 | Lecrone et al. |
| 2010/0042790 A1 | 2/2010 | Mondal et al. |
| 2010/0088296 A1 | 4/2010 | Periyagaram et al. |
| 2011/0035548 A1 | 2/2011 | Kimmel et al. |
| 2011/0087929 A1 | 4/2011 | Koshiyama |
| 2011/0213928 A1 | 9/2011 | Grube et al. |
| 2012/0016840 A1 | 1/2012 | Lin et al. |
| 2012/0079318 A1 | 3/2012 | Colgrove et al. |
| 2012/0084506 A1 | 4/2012 | Colgrove et al. |
| 2012/0290788 A1 | 11/2012 | Klemm et al. |
| 2013/0018854 A1 | 1/2013 | Condict |
| 2013/0019057 A1 | 1/2013 | Stephens |
| 2013/0138862 A1 | 5/2013 | Motwani et al. |
| 2013/0226877 A1 | 8/2013 | Nagal et al. |
| 2013/0238832 A1 | 9/2013 | Dronamraju et al. |
| 2013/0238932 A1 | 9/2013 | Resch |
| 2013/0268497 A1 | 10/2013 | Baldwin et al. |
| 2013/0346810 A1 | 12/2013 | Kimmel et al. |
| 2014/0068184 A1 | 3/2014 | Edwards et al. |
| 2014/0215129 A1 | 7/2014 | Kuzmin et al. |
| 2014/0379965 A1 | 12/2014 | Gole et al. |
| 2015/0234709 A1* | 8/2015 | Koarashi ............. G06F 11/1451 714/6.23 |
| 2016/0070490 A1* | 3/2016 | Koarashi ................ G06F 11/14 711/114 |
| 2017/0109298 A1* | 4/2017 | Kurita ................. G06F 13/1668 |

OTHER PUBLICATIONS

Dictionary definition for references, retrieved from: http://www.dictionary.com/browse/reference?s=t on Dec. 23, 2017.*
Cornwell, Michael, "Anatomy of a Solid-state Drive," ACM Queue—Networks, vol. 10, No. 10, Oct. 2012, pp. 1-7.
"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Hwang, Kai et al., "RAID-x: A New Distributed Disk Array for I/O-centric Cluster Computing", IEEE High-Performance Distributed Computing, Aug. 2000, pp. 279-286.
Lamport, Leslie, "The Part-Time Parliament," ACM Transactions on Computer Systems, vol. 16, No. 2, May 1998, pp. 133-169.
Leventhal, Adam H., "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
Ongaro, Diego et al., "In Search of an Understandable Consensus Algorithm," Stanford University, May 2013. Downloaded from https://https://tamcloud.standford.edu/wiki/downloaded/attachments/11370504/taft.pdf, 14 pages.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
Rosenblum, Mendel, et al., "The Design and Implementation of a Log-Structured File System," Proceedings of the $13^{th}$ ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.
Wu, Po-Liang, et al., "A File-System-Aware FTL Design for Flash-Memory Storage Systems," Design, Automation & Test in Europe Conference & Exhibition, IEEE, 2009, pp. 1-6.

\* cited by examiner

TECHNIQUE FOR MAINTAINING CONSISTENT I/O PROCESSING THROUGHPUT IN A STORAGE SYSTEM

BACKGROUND

Technical Field

The present disclosure relates to storage systems and, more specifically, to maintaining consistent throughput of input/output (I/O) processing by a storage system when changing configuration of one or more Redundant Array of Independent Disks (RAID) groups of storage devices within the storage system.

Background Information

A storage system typically includes one or more storage devices, such as solid state drives, of a storage array at which data may be accessed (i.e., stored and/or retrieved) in accordance with input/output (I/O) requests issued by a host to the storage array. The storage system may organize the storage devices into one or more Redundant Array of Independent Disks (RAID) groups that enhance the reliability and integrity of the data stored on the array by writing data "stripes" having redundant information, i.e., appropriate parity information calculated with respect to the striped data, across a number of storage devices of each RAID group. Each RAID group may be configured according to a set of storage devices having a RAID implementation, e.g., RAID 1, 4, 5 and/or 6, to provide protection over the storage devices in the event of, e.g., failure to one or more of the storage devices.

In response to a RAID configuration change, a prior approach typically halts processing of the I/O requests by the storage array in order to make the necessary configuration change. For example, if the configuration change involves a failed disk, the prior approach may halt I/O processing, even if only temporarily, by the storage system while the configuration is changed, e.g., until the failed disk is logically removed from the configuration, even if the storage array is otherwise able to operate with the changed (e.g., degraded) configuration. That is, the period of time during which the configuration is changed (e.g., logical removal of a disk) synchronizes with I/O processing such that the I/O processing is halted for the duration of that configuration change. However, halting of the I/O processing may adversely impact latency or throughput of the storage system which, in turn, manifests as inconsistent storage system performance to the host.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
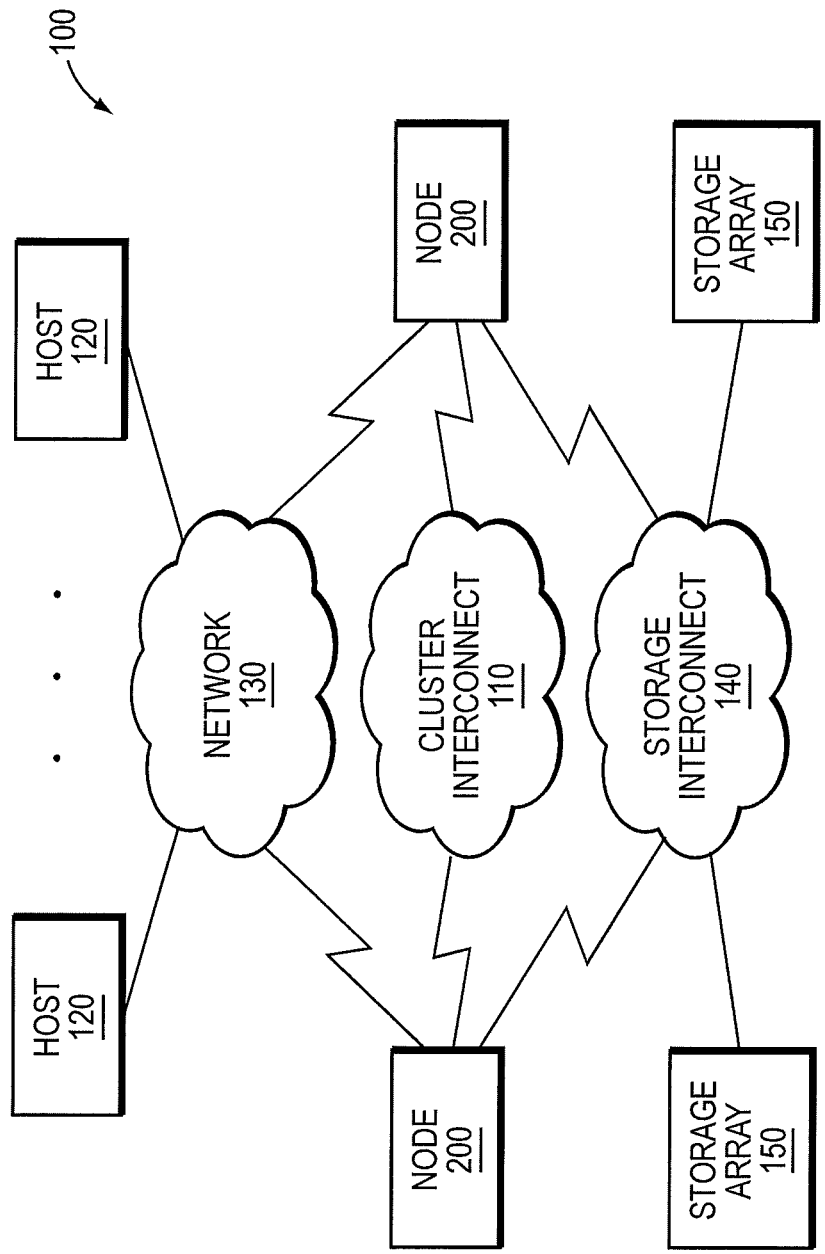
FIG. 1 is a block diagram of a plurality of nodes interconnected as a cluster.

The embodiments described herein are directed to a technique for maintaining consistent throughput of processing input/output (I/O) requests by a storage system when changing redundancy configuration, such as one or more Redundant Array of Independent Disks (RAID), of groups of storage devices within the storage system. The configuration of a RAID group (i.e., RAID configuration) may be represented by RAID objects (e.g., implemented as reference-counted data structures) stored in a memory of the storage system. Illustratively, the RAID objects may be organized as reference-counted data structures within a RAID configuration hierarchy that includes a top-level RAID object (e.g., RAID group data structure) which is linked (e.g., via one or more pointers) to one or more intermediate-level RAID objects (e.g., disk and segment data structures) which, in turn, are linked to one or more low-level RAID objects (e.g., chunk data structures). According to the technique, a snapshot of a current RAID configuration (i.e., current configuration snapshot) may be created by incrementing a reference count of the current top-level object of the hierarchy and attaching (e.g., via a pointer) the current configuration snapshot to a current I/O request processed by the storage system. Each I/O request may thus be associated with a RAID configuration snapshot such that the RAID configuration may change from I/O request to I/O request. Accordingly, a first I/O request may be processed using a first RAID configuration snapshot while an immediately following second I/O request may be processed without delay (i.e., waiting to synchronize a change to the first RAID configuration) using a second RAID configuration snapshot different from the first configuration snapshot.

In response to a RAID configuration change (such as a failed disk and associated chunk), one or more current objects affected by the change (e.g., current disk and chunk data structures describing layout of data) are copied into new objects (e.g., new disk and new chunk data structures) and linked to new copies of their parent objects (e.g., new RAID group and segment data structures), while the reference counts of any current objects unaffected by the change are incremented and their pointers updated to link to a respective new parent object. Once the modifications to the in-memory objects are persisted, the current top-level object (e.g., RAID group data structure) is replaced with a new top-level object and a new configuration snapshot may be created and attached to a new I/O request processed by the storage system. In essence, the technique enables the new configuration as a snapshot referencing the changed RAID configuration, while current I/O requests processed by the system continue to reference the current RAID configuration in their current configuration snapshots. Once processing of all current I/O requests linked to the current configuration snapshots are completed, the reference count on a current object may decrement, e.g., to zero and that object may be destroyed.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
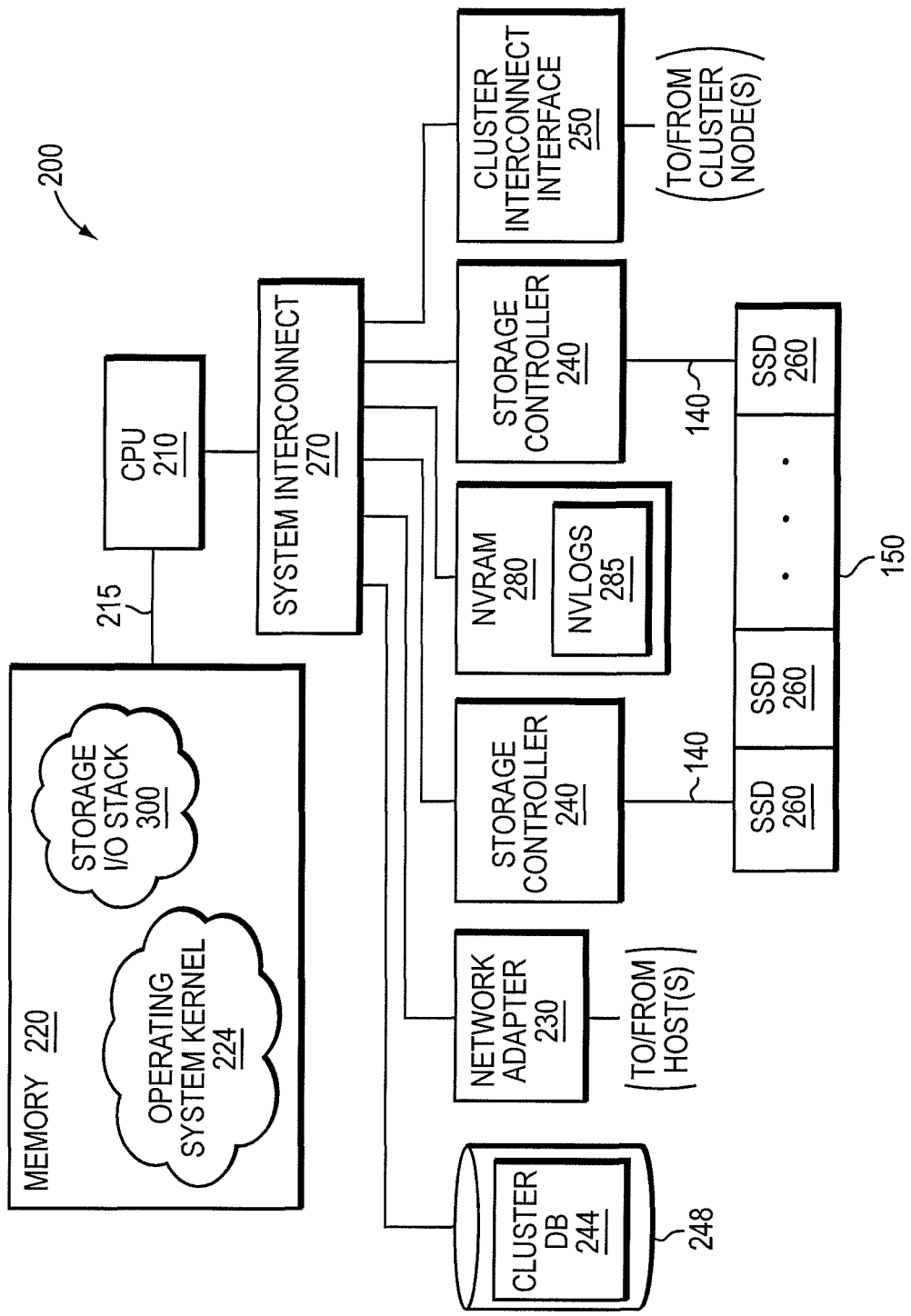
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements may be used, such as a conventional serial ATA (SATA) topology or a PCI topology. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
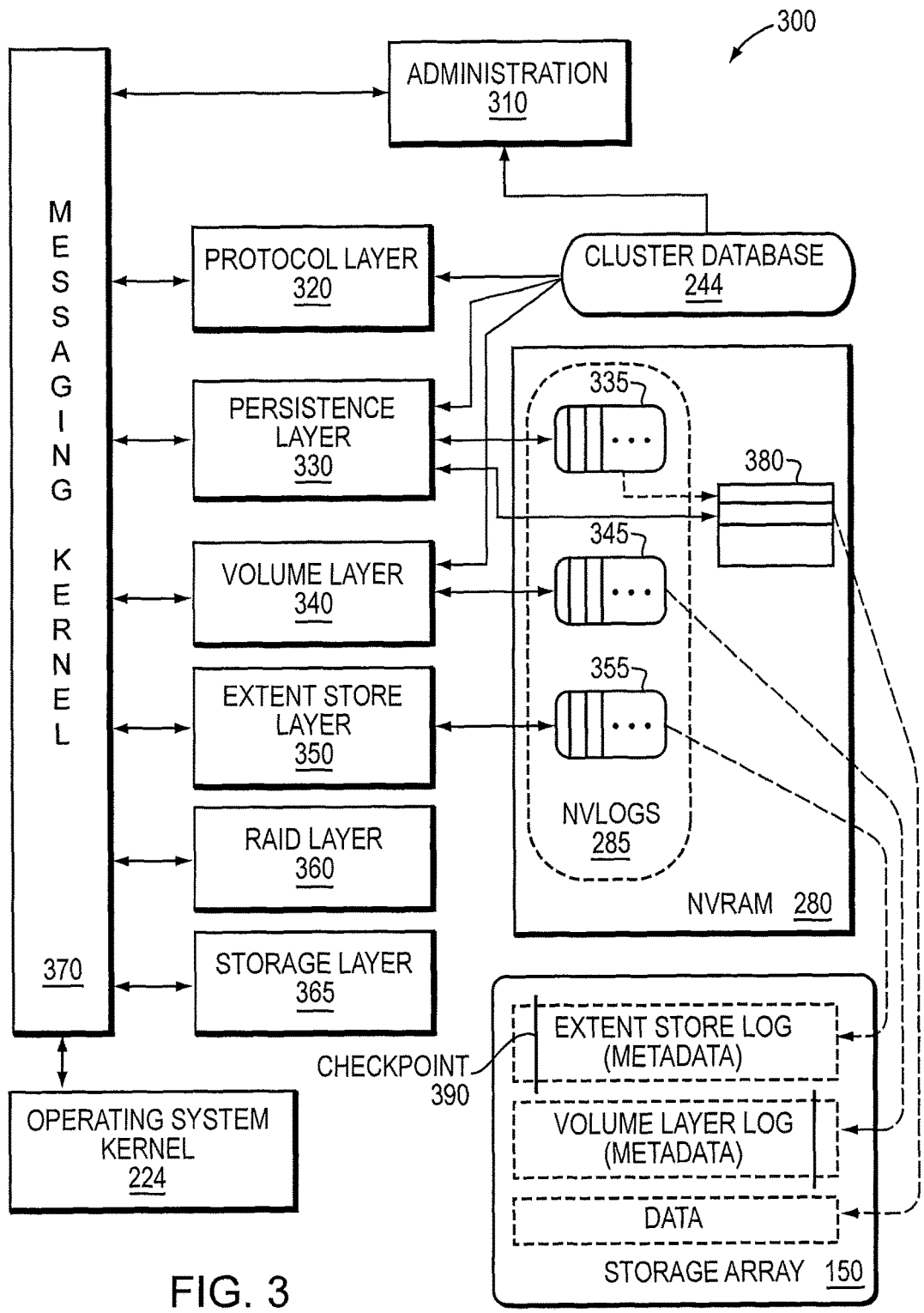
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoints with incremental changes recorded in one or more log files) in which selected in-core mappings (less than the total), are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information calculated with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations.

In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
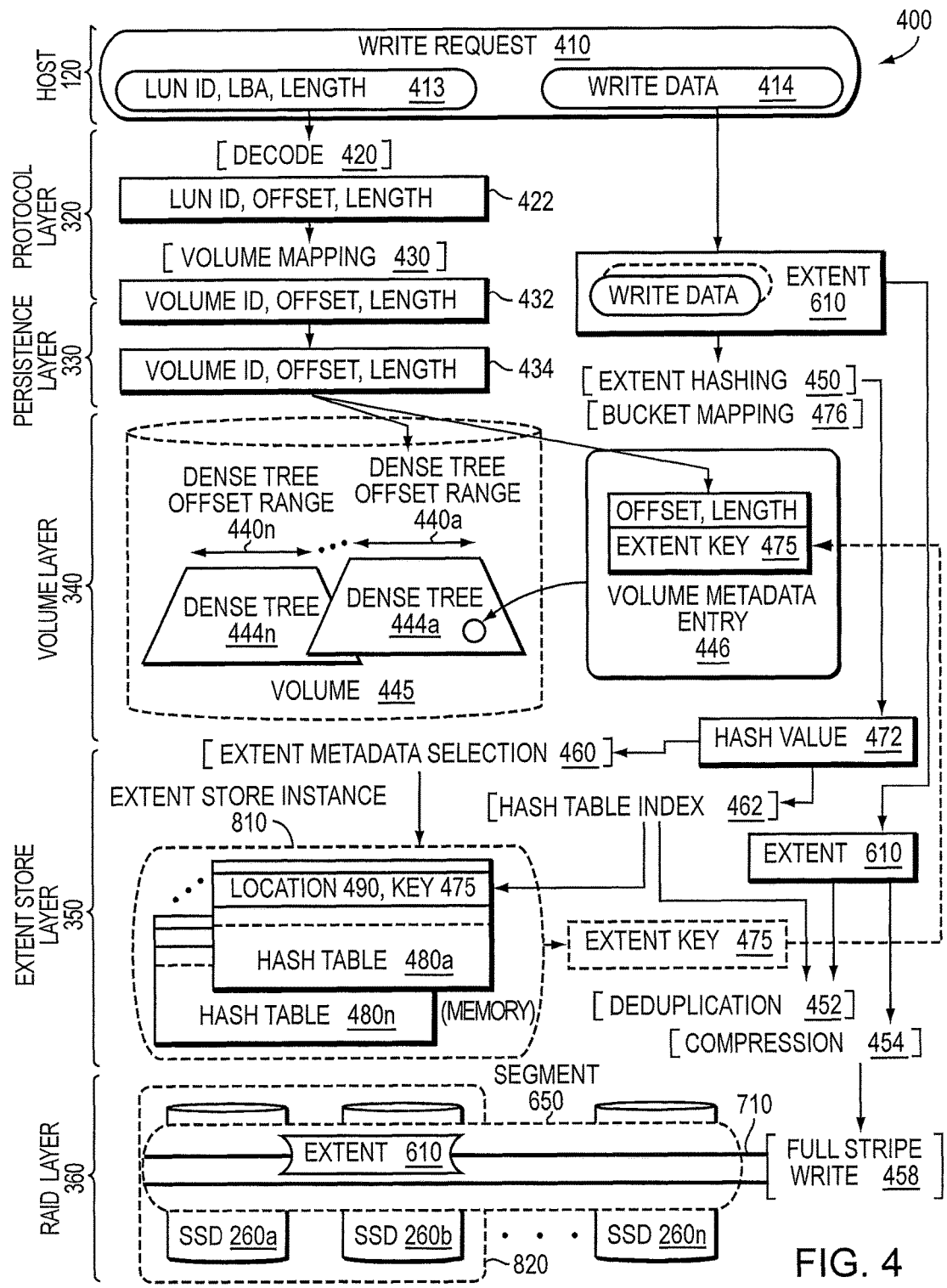
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 610 and perform a hash computation, i.e., a hash function, on the new extent to generate a hash value 472 in accordance with an extent hashing technique 450.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 810) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 610 to the appropriate volume layer instance and onto the appropriate extent store instance via an extent store put operation. The extent hashing technique 450 may embody an approximately uniform hash function to ensure that any random extent to be written may have an approximately equal chance of falling into any extent store instance 810, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 460 that (i) selects an appropriate hash table 480 (e.g., hash table 480a) from a set of hash tables (illustratively in-core) within the extent store instance 810, and (ii) extracts a hash table index 462 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 460 described herein. If a table entry with a matching extent key is found, then the SSD location 490 mapped from the extent key 475 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444a), such that the extent key 475 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table 480n) may be selected by a new candidate extent key in accordance with the extent metadata selection technique 460. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 710 of RAID group 820. The extent store instance may cooperate with the RAID layer 360 to identify a storage segment 650 (i.e., a portion of the storage array 150) and a location on SSD 260 within the segment 650 in which to store the new extent 610. Illustratively, the identified storage segment is a segment with a large contiguous free space having, e.g., location 490 on SSD 260b for storing the extent 610.

In an embodiment, the RAID layer 360 then writes the stripes 710 across the RAID group 820, illustratively as one or more full stripe writes 458. The RAID layer 360 may write a series of stripes 710 of sufficient depth to reduce data relocation that may occur within the flash-based SSDs 260 (i.e., flash block management). The extent store instance then (i) loads the SSD location 490 of the new extent 610 into the selected hash table 480n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
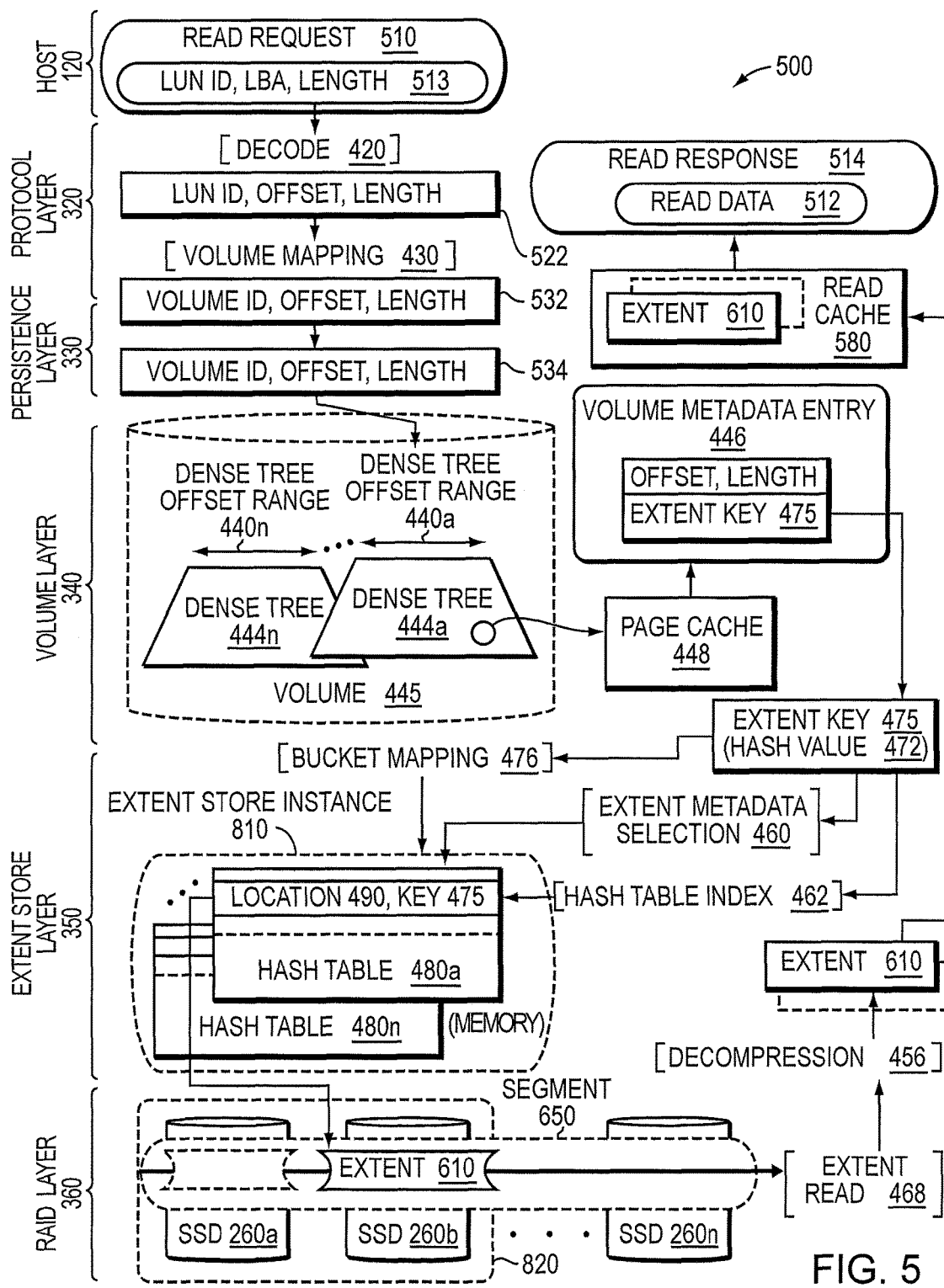
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism, (e.g., RPC, for inter-node communication) or the IPC mechanism, (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 610 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until one or more volume metadata entries 446 of a level are found to ensure that the extent key(s) 475 for the entire requested read range are found. If not metadata entries exist for the entire or portions of the requested range, then the missing portion(s) are zero filled.

Once found, each extent key 475 is processed by the volume layer 340 to, e.g., implement the bucket mapping technique 476 that translates the extent key to an appropriate extent store instance 810 responsible for storing the requested extent 610. Note that, in an embodiment, each extent key 475 may be substantially identical to the hash value 472 associated with the extent 610, i.e., the hash value as calculated during the write request for the extent, such that the bucket mapping 476 and extent metadata selection 460 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 810 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 460 that (i) selects an appropriate hash table 480 (e.g., hash table 480*a*) from a set of hash tables within the extent store instance 810, and (ii) extracts a hash table index 462 from the extent key 475 (i.e., hash value 472) to index into the selected hash table and lookup a table entry having a matching extent key 475 that identifies a storage location 490 on SSD 260 for the extent 610. That is, the SSD location 490 mapped to the extent key 475 may be used to retrieve the existing extent (denoted as extent 610) from SSD 260 (e.g., SSD 260*b*). The extent store instance then cooperates with the RAID layer 360 to access the extent on SSD 260*b* and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Layered File System

The embodiments described herein illustratively employ a layered file system of the storage I/O stack. The layered file system includes a flash-optimized, log-structured layer (i.e., extent store layer) of the file system configured to provide sequential storage of data and metadata (i.e., log-structured layout) on the SSDs 260 of the cluster. The data may be organized as an arbitrary number of variable-length extents of one or more host-visible LUNs served by the nodes. The metadata may include mappings from host-visible logical block address ranges (i.e., offset ranges) of a LUN to extent keys, as well as mappings of the extent keys to SSD storage locations of the extents. Illustratively, the volume layer of the layered file system cooperates with the extent store layer to provide a level of indirection that facilitates efficient log-structured layout of extents on the SSDs by the extent store layer.

In an embodiment, functions of the log-structured layer of the file system, such as write allocation and flash device (i.e., SSD) management, are performed and maintained by the extent store layer 350. Write allocation may include gathering of the variable-length extents to form full stripes that may be written to free segments across SSDs of one or more RAID groups, whereas flash device management may include segment cleaning to create such free segments that indirectly map to the SSDs. Instead of relying on garbage collection in the SSDs, the storage I/O stack may implement segment cleaning (i.e., garbage collection) in the extent store layer to bypass performance impacts of flash translation layer (FTL) functionality (including garbage collection) in the SSD. In other words, the storage I/O stack allows the log-structured layer of the file system to operate as a data layout engine using segment cleaning to effectively replace the FTL functionality of the SSD. The extent store layer may thus process random write requests in accordance with segment cleaning (i.e., garbage collection) to predict flash behavior within its FTL functionality. As a result, a log-structured equivalent source of write amplification for the storage I/O stack may be consolidated and managed at the extent store layer. In addition, the log-structured layer of the file system may be employed, in part, to improve write performance from the flash devices of the storage array.

Segment Cleaning

Figure 6:
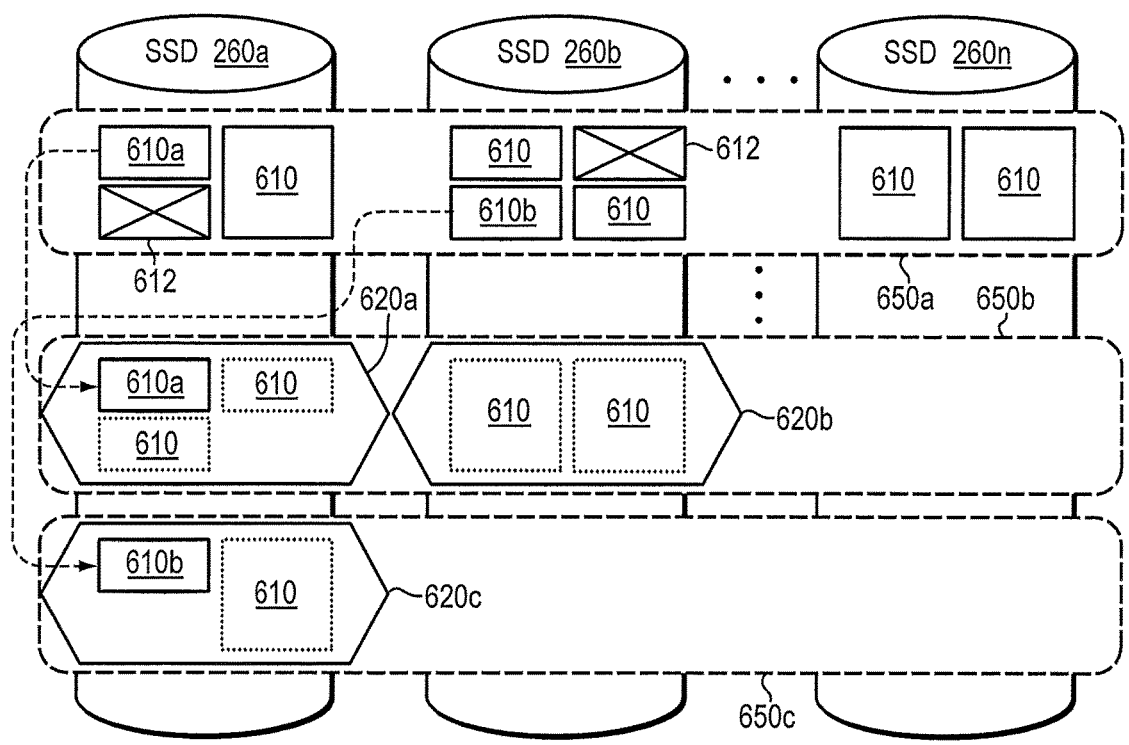
FIG. 6 illustrates segment cleaning by a layered file system of the storage I/O stack.

FIG. 6 illustrates segment cleaning by the layered file system. In an embodiment, the extent store layer 350 of the layered file system may write extents to an empty or free region or "segment." Before rewriting that segment again, the extent store layer 350 may clean the segment in accordance with segment cleaning which, illustratively, may be embodied as a segment cleaning process. The segment cleaning process may read all valid extents 610 from an old segment 650*a* and write those valid extents (i.e., extents not deleted or overwritten 612) to one or more new segments 650*b-c*, to thereby free-up (i.e., "clean") the old segment 650*a*. New extents may then be written sequentially to the old (now clean) segment. The layered file system may maintain a certain amount of reserve space (i.e., free segments) to enable efficient performance of segment cleaning. For example, the layered file system may illustratively maintain a reserve space of free segments equivalent to approximately 7% of storage capacity. The sequential writing of new extents may manifest as full stripe writes 458, such that a single write operation to storage spans all SSDs in a RAID group 820. Write data may be accumulated until a stripe write operation of a minimum depth can be made.

Illustratively, segment cleaning may be performed to free one or more selected segments that indirectly map to SSDs. As used herein, a SSD may be composed of a plurality of segment chunks 620, wherein each chunk is illustratively approximately 1 GB in size. A segment may include a segment chunk 620*a-c* from each of a plurality of SSDs in a RAID group 820. Thus, for a RAID group having 24 SSDs, wherein 22 SSDs store data (data SSDs) and 2 SSDs store parity (parity SSDs), each segment may include 22 GB of data and 2 GB of parity. The RAID layer may further configure the RAID groups according to one or more RAID implementations, e.g., RAID 1, 4, 5 and/or 6, to thereby provide protection over the SSDs in the event of, e.g., failure to one or more SSDs. Notably, each segment may be associated with a different RAID group and, thus, may have a different RAID configuration, i.e., each RAID group may be configured according to a different RAID implementation. To free-up or clean selected segments, extents of the segments that contain valid data are moved to different clean segments and the selected segments (now clean) are freed for subsequent reuse. Segment cleaning consolidates fragmented free space to improve write efficiency, e.g., to underlying flash blocks by reducing performance impacts of the FTL. Once a segment is cleaned and designated freed, data may be written sequentially to that segment. Accounting structures, e.g., free segment maps or an amount of segment free space, maintained by the extent store layer for write allocation, may be employed by the segment cleaning process. Notably, selection of a clean segment to receive data (i.e., writes) from a segment being cleaned may be based upon the amount of free space remaining in the clean segment and/or the last time the clean segment was used. Note further that different portions of data from the segment being cleaned may be moved to different "target" segments. That is, a plurality of relatively clean segments $650b,c$ may receive differing portions of data from the segment $650a$ being cleaned.

Illustratively, segment cleaning may cause some write amplification in the storage array (SSDs). However, the file system may reduce such write amplification by writing extents to the SSDs sequentially as a log device. For example, given SSDs with an erase block size of approximately 2 MBs, by writing at least 2 MB of data (extents) sequentially to a free segment, an entire erase block may be overwritten and fragmentation at the SSD level may be eliminated (i.e., reducing garbage collection in the SSD). Yet, the SSDs typically stripe data across multiple flash components and across multiple channels (i.e., storage controllers 240) in order to realize performance. Thus, a relatively large (e.g., 1 GB) write granularity to a free (i.e., clean) segment may be necessary to avoid write amplification at the SSD level (i.e., to override internal SSD striping).

In an embodiment, because the erase block boundaries in the SSD may be unknown, the write granularity should be large enough so that a sequence of writes for extents over a large contiguous range may overwrite previously written extents on the SSD and effectively override garbage collection in the SSDs. In other words, such garbage collection may be preempted because the new data is written over the same range as previous data such that the new data completely overwrites the previously written data. This approach also avoids consuming the reserve space capacity with the new write data. Accordingly, an advantage of the log-structured feature of the storage I/O stack (i.e., log-structured layer of the file system) is the ability to reduce write amplification of the SSDs with only a minimum amount of reserve space in the SSDs. This log-structured feature effectively "moves" flash device management of reserve space from the SSD to the extent store layer, which uses that reserve space to manage the write amplification. Thus, instead of having two sources of write amplification (i.e., the extent store layer and the SSD FTL, which multiply) there is only one source of write amplification (i.e., the extent store layer).

Write Allocation

In an embodiment, there may be multiple RAID stripes per segment. Each time a segment is allocated, i.e., after cleaning the segment, the chunks of various SSDs within the segment may include a series of RAID stripes, each aligned by extent. The chunks may be at the same or different offsets within the SSDs. The extent store layer may read the chunks sequentially for cleaning purposes and relocate all the valid data to another segment. Thereafter, the chunks 620 of the cleaned segment may be freed and a decision may be rendered as to how to constitute the next segment that uses the chunks. For example, if a SSD is removed from a RAID group, a portion (i.e., a set of chunks 620) of capacity may be omitted from the next segment (i.e., change in RAID stripe configuration) so as to constitute the RAID group from a plurality of chunks 620 that is one chunk narrower, i.e., making the RAID width one less. Thus, by using segment cleaning, a RAID group of the chunks 620 constituting the segments may be effectively created each time a new segment is allocated, i.e., a RAID group is created dynamically from available SSDs when a new segment is allocated. There is generally no requirement to include all of the SSDs 260 in the storage array 150 in the new segment. Alternatively, a chunk 620 from a newly introduced SSD can be added into a RAID group created when a new segment 650 is allocated.

Figure 7A:
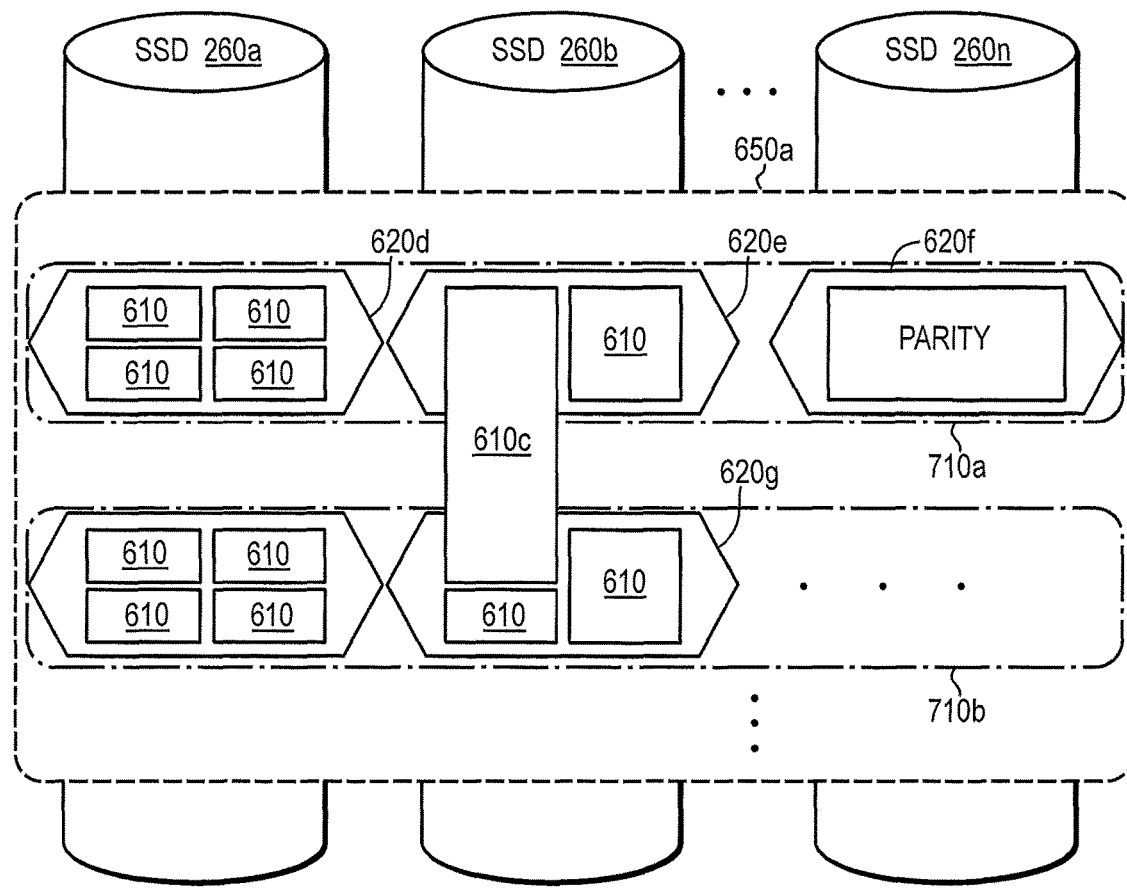
FIG. 7a illustrates a RAID stripe formed by the layered file system.

FIG. 7a illustrates a RAID stripe formed by the layered file system. As noted, write allocation may include gathering of the variable-length extents to form one or more stripes across SSDs of one or more RAID groups. In an embodiment, the RAID layer 360 may manage parity computations and topology information used for placement of the extents 610 on the SSDs $260a$-$n$ of the RAID group 820. To that end, the RAID layer may cooperate with the extent store layer to organize the extents as stripes 710 within the RAID group. Illustratively, the extent store layer may gather the extents 610 to form one or more full stripes 710 that may be written to a free segment $650a$ such that a single stripe write operation 458 may span all SSDs in that RAID group. The extent store layer may also cooperate with the RAID layer to pack each stripe 710 as a full stripe of variable-length extents 610. Once the stripe is complete, the RAID layer may pass the full stripe 710 of extents as a set of chunks $620d$-$f$ to the storage layer 365 of the storage I/O stack for storage on the SSDs 260. By writing a full stripe (i.e., data and parity) to the free segment, the layered file system avoids the cost of parity updates and spreads any required read operation load across the SSDs.

In an embodiment, an extent store may be viewed as a global pool of extents stored on the storage arrays 150 of the cluster, where each extent may be maintained within a RAID group 820 of the extent store. Assume one or more variable-length (i.e., small and/or large) extents are written to a segment. The extent store layer may gather the variable-length extents to form one or more stripes across the SSDs of the RAID group. Although each stripe may include multiple extents 610 and an extent $610c$ could span more than one stripe $710a,b$, each extent is entirely stored on one SSD. In an embodiment, a stripe may have a depth of 16 KB and an extent may have a size of 4 KB, but the extent may thereafter be compressed down to 1 or 2 KB or smaller permitting a larger extent to be packed which may exceed the stripe depth (i.e., the chunk $620g$ depth). Thus, a stripe may constitute only part of the extent, so the depth of the stripe 710 (i.e., the set of chunks $620d$-$f$ constituting the stripe) may be independent of the extent(s) written to any one SSD. Since the extent store layer may write the extents as full stripes across one or more free segments of the SSDs, write amplification associated with processing information of the stripes may be reduced.

Segment-Based RAID Configuration

The embodiments described herein illustratively store RAID-related metadata on a distributed database of the cluster (i.e., the cluster database), which is separate and apart from a storage array of SSDs configured to serve as main storage for the nodes of the cluster. The RAID-related metadata may be embodied as RAID labels (or other data structures) having configuration information that identifies one or more RAID groups associated with an extent store and storage devices, e.g., SSDs, within each RAID group. In turn, each segment of the extent store may be associated with a RAID group (and its associated data structures). Accordingly, each segment may have a different (i.e., its own) RAID configuration as the storage pool changes (i.e., addition and/or removal of SSDs).

Figure 7B:
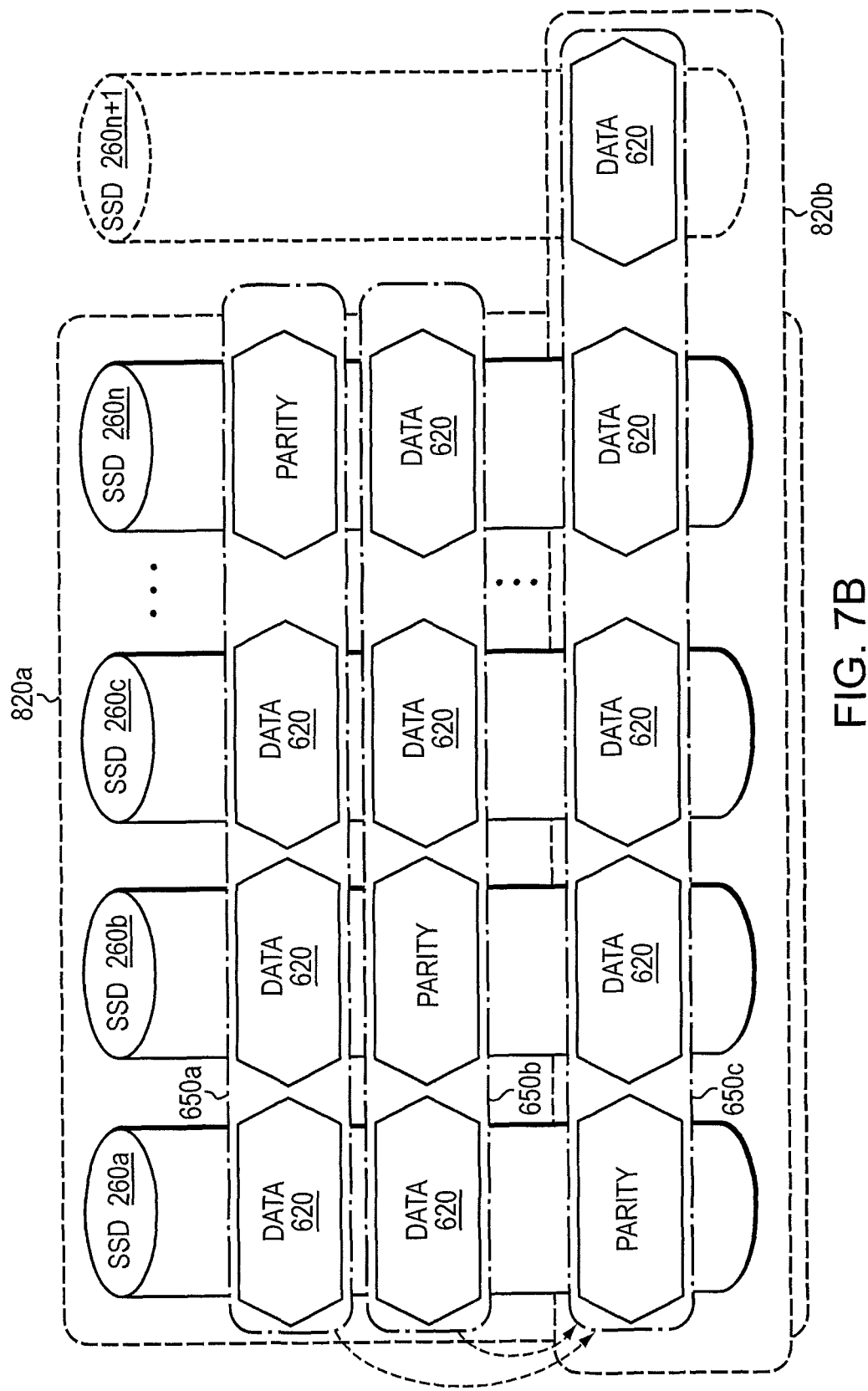
FIG. 7b illustrates changes to a segment-based RAID configuration in accordance with changes to a storage pool of the cluster.

FIG. 7*b* illustrates changes to a segment-based RAID configuration in accordance with changes to the storage pool of the cluster. Illustratively, a plurality of segments 650*a,b* is associated with a RAID group 820*a* having a set of SSDs 260*a-n*. A new (i.e., additional or replacement) SSD 260*n*+1 may be added to the storage array such that existing segments 650*a,b* include SSDs 260*a-n*, while a new segment 650*c* includes SSDs 260*a-n* in addition to SSD 260*n*+1. As the segments 650*a,b* are cleaned, data is written (i.e., moved) from those segments to the segment 650*c*. A new RAID group 820*b* may be created once new segment 650*c* is allocated. The layered file system may then write extents to the new segment 650*c* with the additional capacity available for immediate use either to recover from a degraded level of redundancy or to store additional data.

Figure 8:
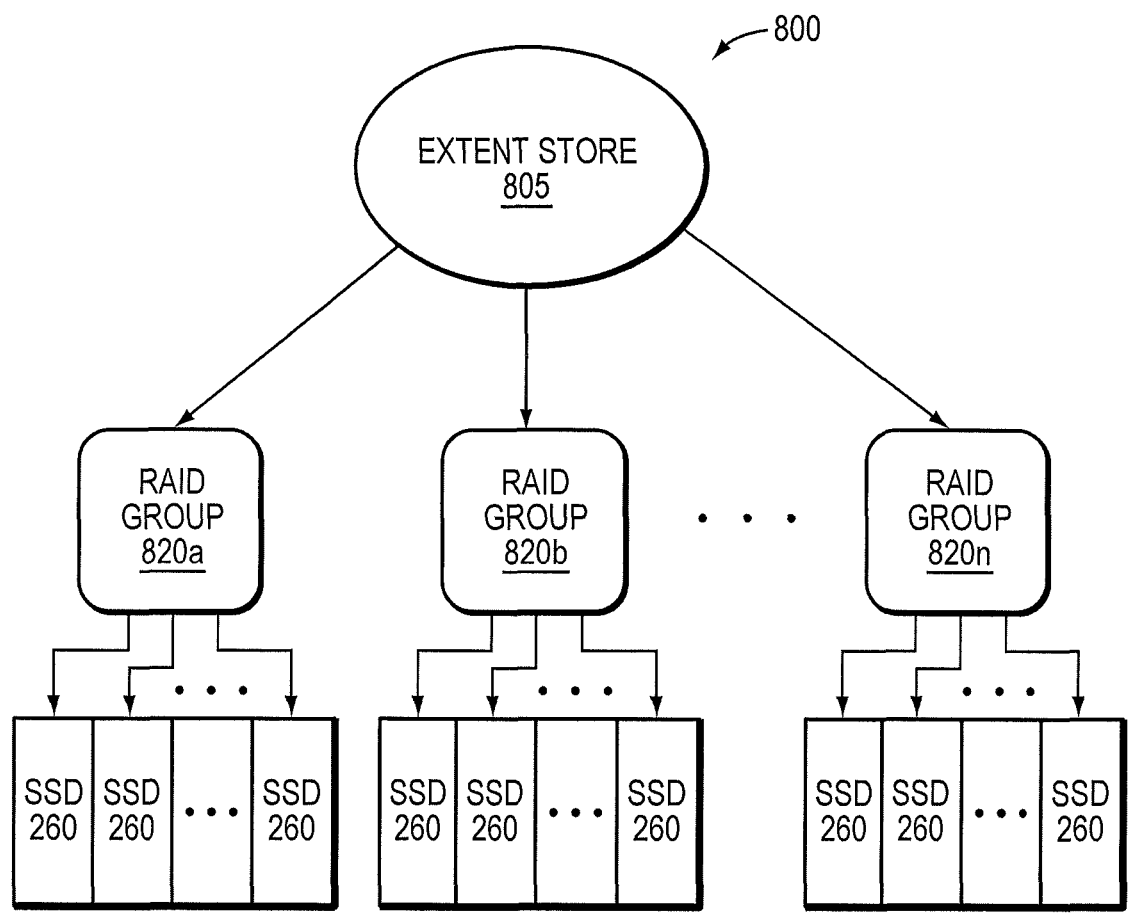
FIG. 8 illustrates a RAID configuration topology tree structure.

Each SSD may be part of a RAID configuration topology tree structure that defines an extent store using a multi-level hierarchy (e.g., three levels), wherein the first level of the tree identifies the SSD, the second level identifies the RAID group to which the SSD belongs, and the third level identifies the extent store or storage container to which the RAID group belongs. FIG. 8 illustrates a RAID configuration topology tree structure. An extent store 805 may include one or more RAID groups 820*a-n*, each of which may include one or more SSDs 260. Illustratively, each RAID group may be associated with at least one segment of the extent store. That is, a plurality of segments may be associated with the same RAID group, so that RAID groups may vary by segment (or remain the same), i.e., segment-based RAID configuration. Accordingly, SSDs of the storage array are assimilated into RAID groups by segment. As noted, RAID groups are illustratively created when segments are allocated.

Figure 9:
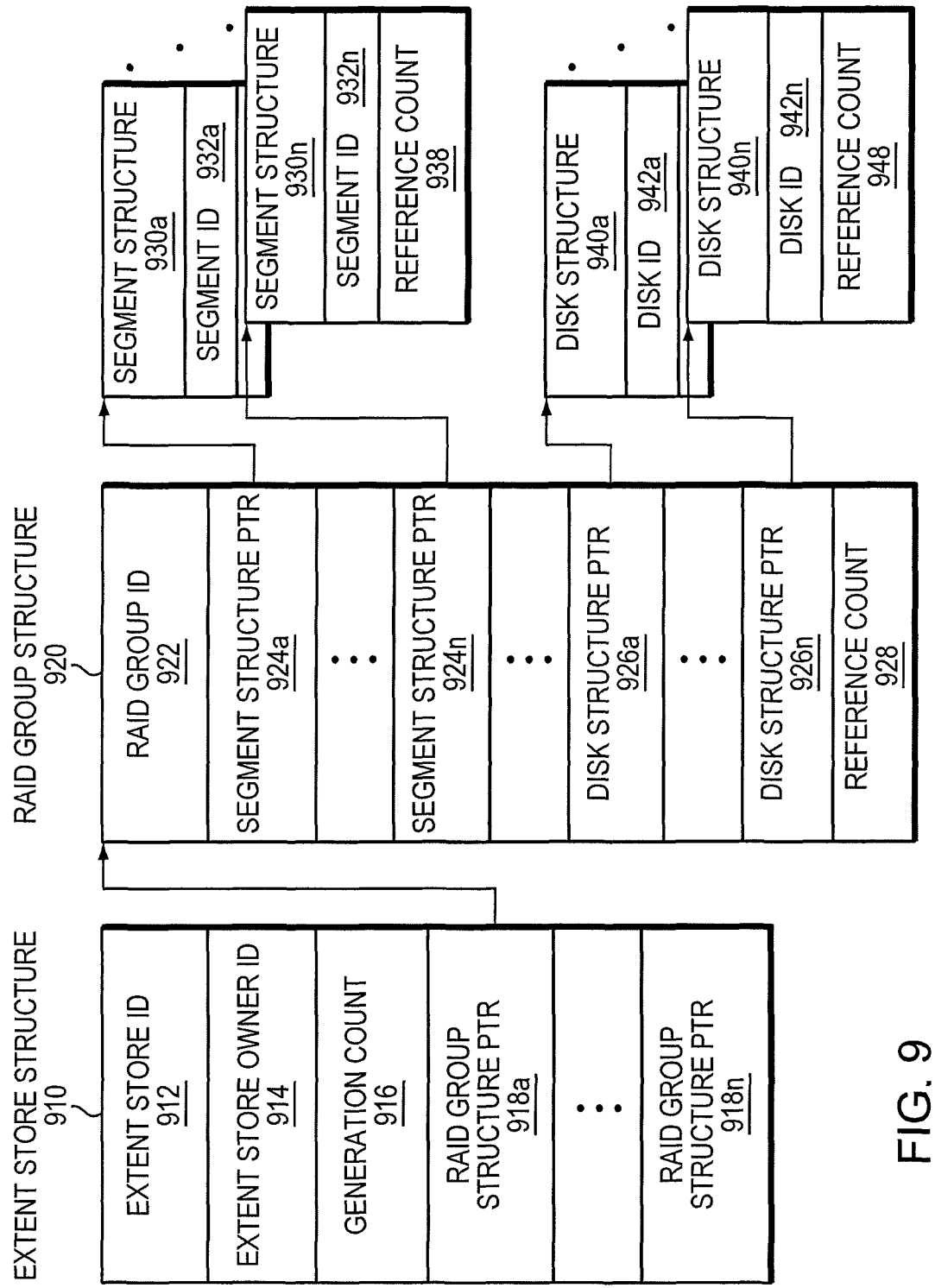
FIG. 9 is a block diagram of data structures representing a RAID configuration.

FIG. 9 is a block diagram of data structures representing a RAID configuration, i.e., the RAID configuration data structures. In one or more embodiments, the RAID configuration data structures include an extent store (data) structure 910, as well as one or more RAID group (data) structures 920, segment (data) structures 930 and disk (data) structures 940, each of which is illustratively stored on the cluster database 244. The extent store data structure 910 illustratively includes an extent store identifier (ID) 912 that identifies an extent store within the cluster 100 and an extent store owner ID 914 that identifies a node 200 which serves (i.e., "owns") the extent store. In an embodiment, a notion of ownership of a storage device by a node is replaced with ownership of a storage container or extent store (i.e., aggregate) by a node; such extent store ownership is identified by the extent store owner ID 914. A generation count 916 illustratively identifies a version of the extent store data structure 910. In an embodiment, the generation count 916 may be incremented when the extent store data structure changes (i.e., is updated). The extent store data structure 910 also includes one or more pointers 918*a-n* (RAID group structure ptrs), each of which references (points to) a RAID group data structure 920.

The RAID group data structure 920 may include one or more segment structure pointers 924*a-n* and one or more disk structure pointers 926*a-n*. Illustratively, each segment structure pointer references a respective segment data structure 930*a-n* and each disk structure pointer references a respective disk data structure 940*a-n*. Each of the segment data structures and the disk data structures may include a respective identifier: a segment ID 932*a-n* that identifies a segment of the extent store and a disk ID 942*a-n* that identifies an SSD of the storage arrays 150. Notably, SSDs 260 are assimilated into appropriate RAID group data structures when the each node is booted or at run-time when a segment is allocated and the SSDs have changed (i.e., failed, removed or added).

RAID Configuration Snapshot

The embodiments described herein are directed to a technique for maintaining consistent throughput of processing of I/O requests, such as read and write requests, by the storage system when changing redundancy configuration, such as one or more RAID groups, of storage devices within the system. The configuration of a RAID group (i.e., RAID configuration) may be represented by RAID objects stored in a memory of the storage system and arranged as a RAID configuration hierarchy. Illustratively, steady (i.e., uninterrupted) I/O request processing is maintained in accordance with the technique through interaction between the extent store layer and RAID layer to create a snapshot of the RAID configuration (i.e., configuration snapshot), so that each I/O request is associated with a consistent RAID configuration as the I/O request is processed. Accordingly, each I/O request may be associated with a different RAID configuration (i.e., a different snapshot) as the configuration changes. For example, the extent store layer may coalesce I/O requests, such as write requests and associated write data, to create full stripe writes 458 that are issued to the RAID layer. In response, the RAID layer may organize the RAID objects of the RAID configuration hierarchy into a RAID configuration that is used for storing the write data on the disks, e.g., SSD. The RAID layer may then create the configuration snapshot that identifies the RAID objects of the RAID configuration, and associate (e.g., attach) the snapshot with the I/O requests. Note that a new configuration snapshot is created when the RAID configuration changes, which then may be associated with a current I/O request. Otherwise a prior configuration snapshot may be associated with the current I/O request and a reference count tracking use of that prior configuration snapshot may be increased. Accordingly, the reference count of a RAID configuration tracks a number of I/O requests using (i.e., referencing) that RAID configuration. Note also that changes (i.e., updates) to the RAID configuration may occur asynchronously to processing of I/O requests by the RAID layer, i.e., a first I/O request processed prior to a change of the RAID configuration may be associated with configuration snapshot not including the change, whereas a second I/O request processed after the update of the RAID configuration may be associated with a new configuration snapshot that includes the change. In other words, fencing of I/O requests to protect against RAID configuration changes is unnecessary.

Figure 10:
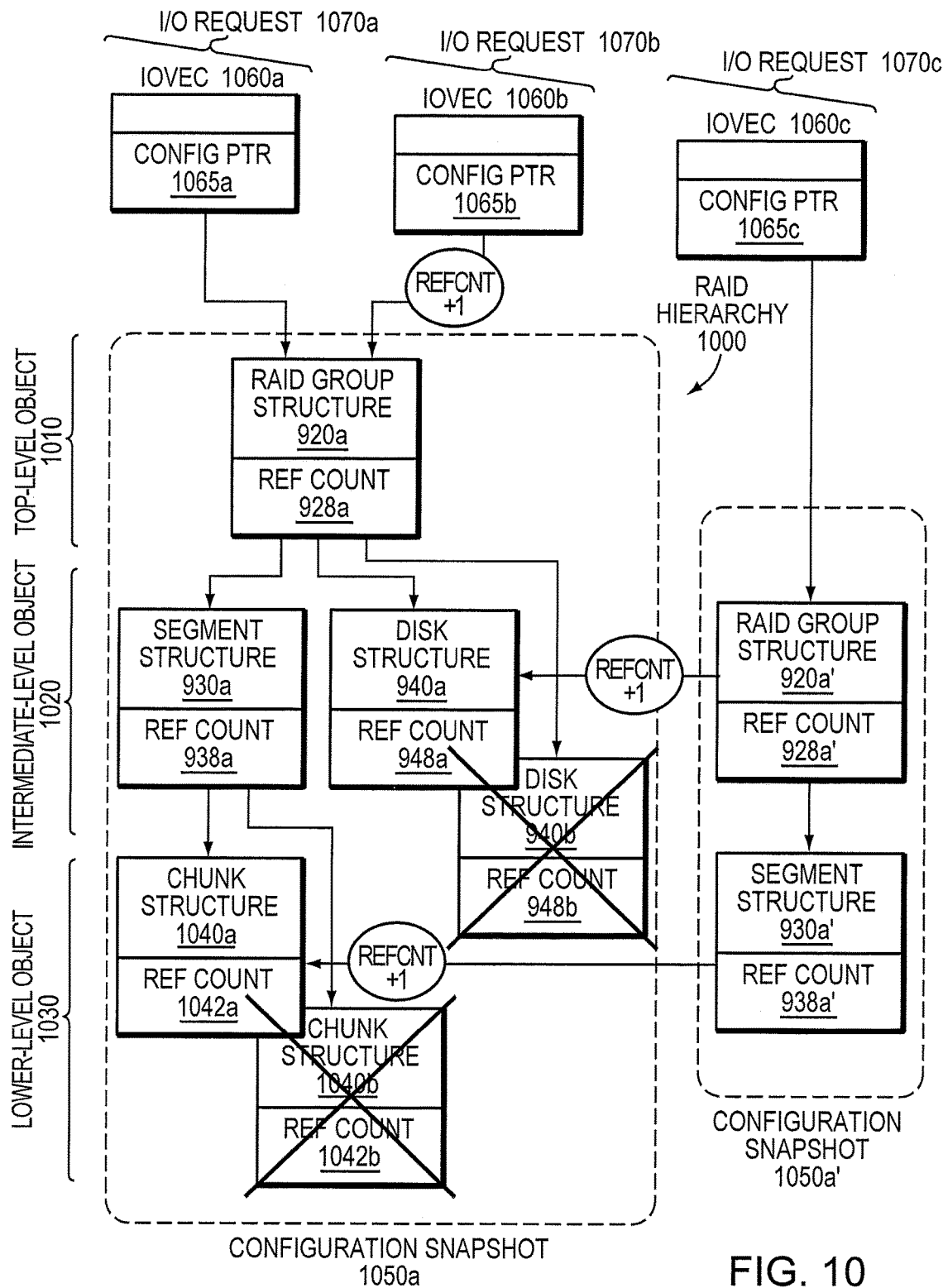
FIG. 10 is a block diagram of a RAID configuration hierarchy of the RAID objects.

FIG. 10 is block diagram of a RAID configuration hierarchy of the RAID objects. In an embodiment, the RAID configuration hierarchy 1000 includes a top-level RAID object 1010 (e.g., RAID group data structure 920) that is linked (e.g., via one or more pointers) to one or more intermediate-level RAID objects 1020 (e.g., segment data structure 930 and disk data structure 940) which, in turn, are linked to one or more low-level RAID objects 1030 (e.g., chunk data structure 1040). Illustratively, the RAID objects are embodied as reference-counted data structures, i.e., each of the data structures includes a reference count field. For example, the RAID group data structure 920 includes a reference count field 928, the segment data structure 930 includes a reference count field 938, the disk data structure 940 includes a reference count field 948 and the chunk data structure 1040 includes a reference count field 1042.

When organized into a RAID configuration, each lower-level (i.e., "child") object (e.g., chunk structure 1040*a*)

maintains a reference count to its "parent" objects (e.g., intermediate-level objects) and each intermediate-level child object maintains a reference count to its parent objects (e.g., the top-level objects). That is, each object maintains a reference count indicating a number of references to that object by parents of the object. For example, segment structure 930a is referenced by RAID group structure 920a and, thus, has a reference count of at least 1; whereas, disk structure 940a is referenced by both RAID group structure 920a and 920a' and, thus, has a reference count of at least 2. Similarly chunk structure 1040a is referenced by segment structures 930a and 930a' and, thus, has a reference count of at least 2. Illustratively, creation of an initial RAID configuration involves exactly one reference count of each child object to its parent object. Accordingly, creation of a configuration snapshot 1050a for the RAID configuration thus entails obtaining the reference count on the parent object 920a, 920a', which ensures reference-count consistency of the children objects, i.e., ensures that none of the reference counts for the children objects go out of scope.

According to the technique, a configuration snapshot 1050a, a' of the RAID configuration may be created by attaching a reference (e.g., via a pointer) for the RAID group (parent) object to one or more I/O requests 1070a,b,c processed by the storage system, e.g., the storage layer 365 of the storage I/O stack 300, and incrementing a reference count (i.e., the content of reference count field 928) of the top-level object 1010 (i.e., the RAID group data structure 920) of the hierarchy 1000. Attaching of the reference to the I/O requests may be effected by a pointer embodied as an I/O vector (iovec) 1060a,b,c. Illustratively, the RAID layer may construct the iovec and pass that iovec along with a pointer 1065a,b,c referencing the RAID group object (RAID group data structure 920a, a') to the storage layer 365 as part of the I/O requests 1070 (e.g., full stripe write 458). The storage layer 365 may employ the iovec 1070 to identify the configuration snapshot 1050, including the segment, SSD and associated chunk, destined to store the write data of the iovec. That is, the RAID layer assembles the full stripe write 458 as a set of I/O requests (e.g., I/O requests 1070a,b,c) which, in turn, are processed by the storage layer. Note that the storage layer need not have any knowledge of the RAID objects. Once the storage layer completes writing the data of the I/O request to SSD (i.e., the write data is persisted on the SSDs) the RAID layer, in response, may decrement the reference count of the top-level object 1010 (e.g., ref count 928a of RAID group structure 920a).

Assume an SSD (associated with disk structure 940b) of the RAID group 920a fails and the storage layer notifies the RAID layer of the failure, resulting in a configuration change to the RAID group such that the disk structure 940b associated with the failed SSD and a chunk structure 1040b associated with a chunk on the failed SSD are removed from the RAID group. In response to the RAID configuration change (e.g., the failed disk and associated chunk), the RAID layer may copy one or more current objects (i.e., the RAID group structure 920a and the segment structure 930a) affected by the change into new objects (e.g., new RAID group structure 920a' and segment structure 930a') and link any further new objects to the new copies of their parent objects (e.g., the new RAID group and segment data structures). Illustratively, the RAID layer then increments the reference counts of any current objects unaffected by the change (i.e., disk structure 940a and chunk structure 1040a). The RAID layer may then persist the modifications to the in-memory objects (data structures) to, e.g., SSD. Thereafter, the RAID layer may replace the current top-level object (RAID group data structure 920a) with a new top-level object (RAID group 920a'), create a new configuration snapshot 1050a' and attach the new snapshot (via an iovec 1060c) to a new I/O request 1070c processed by the storage layer of the storage system.

Assume now that a SSD fails and the RAID layer has not received notification from the storage layer of the failure. From the perspective of the RAID layer, all SSDs of the RAID group are functional and on-line. Upon receiving I/O request 1070b (i.e., coalesced writes) of a full stripe write 458, the RAID layer uses the current configuration snapshot 1050a of the current RAID configuration (e.g., RAID group structure 920a), increments the reference count of the parent object of the configuration (RAID group data structure 920a) and attaches the current snapshot 1050a to the I/O request 1070b passed to the storage layer. The storage layer processes the request by attempting to store the write data to the segment and SSDs (including the failed SSD) identified by the RAID configuration snapshot. Note that the protection provided by the RAID implementation, e.g., RAID 6, enables reconstruction of the data destined to the failed SSD in response to a subsequent read request processed by the storage layer. As a result, I/O requests 1070a,b,c continue to flow to the storage layer without disruption, thereby maintaining consistent throughput of I/O request processing in the storage system. Notably, writes to the failed SSD may be retried (e.g., as I/O request 1070c) by the RAID layer after receiving notification of the failure of the SSD using the new snapshot 1050a' of the configuration having an updated RAID configuration (e.g., RAID group structure 920a') with the failed SSD (e.g., disk structure 940b) removed.

In essence, the technique enables new configuration snapshots (e.g., 1050a') to reference the changed RAID configuration (RAID group structure 920a'), while current I/O requests (e.g., 1070b) processed by the storage system continue to reference the current RAID configuration 1050a in their current configuration snapshots. Once processing of all current I/O requests linked to the current configuration snapshots are completed, the reference count on a current object may decrement, e.g., to zero and that object may be destroyed.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving a plurality of write requests directed towards a logical unit (LUN), each write request having respective data and processed at a storage system connected to an array of storage devices;
   organizing a set of the storage devices into a first redundancy group having a first redundancy configuration including a first storage device, the first redundancy group represented by a first redundancy group object having a first reference count indicating a number of pointers to the first redundancy group object, the first storage device represented by a storage device object referenced by a pointer included in the first redundancy group object;
associating a first write request with the first redundancy group object;
increasing the first reference count of the first redundancy group object;
processing the first write request; and
in response to completing processing of the first write request, decreasing the first reference count of the first redundancy group object.

2. The method of claim 1 further comprising:
in response to a failure of the first storage device,
creating a copy of the first redundancy group object into a second redundancy group,
removing the storage device object referenced from the copy of the first redundancy group object to create a second redundancy group object having a second redundancy configuration different from the first redundancy configuration,
associating a second write request with the second redundancy group object; and
processing the second write request using the second redundancy configuration.

3. The method of claim 2 wherein processing the first write request further comprises:
in response to an error communicating with the first storage device, re-associating the first write request with the second redundancy group object, and re-processing the first write request using the second redundancy configuration.

4. The method of claim 2 wherein each redundancy group is represented by a hierarchy of objects, and wherein the second redundancy group shares at least one object of its respective hierarchy of objects with the first redundancy group.

5. The method of claim 1 wherein each redundancy group is represented by a hierarchy of parent and child objects, each child object having a second reference count indicating a number of pointers to one or more parent objects.

6. The method of claim 5 wherein processing the first write request further comprises:
storing the respective data to the first storage device of the first redundancy configuration as a chunk represented by a chunk object, the chunk object included in the hierarchy of objects of the first redundancy group;
calculating redundant information based on the chunk; and
storing the redundant information to a second storage device of the first redundancy configuration.

7. The method of claim 1 wherein processing the first write request further comprises:
storing the respective data in a segment across the set of storage devices of the first redundancy configuration, wherein the segment has a log-structured layout.

8. The method of claim 1 further comprising:
in response to the first reference count of the first redundancy group object reaching a sentinel value, deleting the first redundancy group object.

9. The method of claim 1 wherein the storage devices are solid state drives.

10. A method comprising:
receiving a plurality of write requests directed towards a logical unit (LUN), each write request having respective data and processed at a storage system connected to an array of storage devices;
organizing a set of storage devices into a redundancy group having a first redundancy configuration represented by a redundancy group object having a reference count indicating a number of pointers to the first redundancy group object;
incrementing the reference count of the first redundancy group in response to creating a snapshot of the redundancy group;
associating a first write request with the snapshot of the redundancy group object;
in response to a failure of a storage device in the set of storage devices of the redundancy group,
updating the redundancy group object to remove the failed storage device so that the redundancy group is updated to have a second redundancy configuration different from the first redundancy configuration,
decrementing the reference count of the first redundancy group, associating a second write request with the redundancy group object;
processing the first write request according to the first redundancy configuration using the snapshot of the redundancy group; and
processing the second write request according to the second redundancy configuration using the updated redundancy group.

11. A system comprising:
a storage system having a memory connected to a processor;
a storage array coupled to the storage system and having one or more solid state drives (SSDs);
a storage I/O stack executing on the processor of the storage system, the storage I/O stack configured to:
receive a plurality of write requests directed towards a logical unit (LUN);
organize a set of the SSDs into a first redundancy group having a first redundancy configuration including a first SSD, the first redundancy group represented by a first redundancy group object having a first reference count indicating a number of pointers to the first redundancy group object, the first SSD represented by a storage device object referenced by a pointer included in the first redundancy group object;
associate a first write request with the first redundancy group object;
increase the first reference count of the first redundancy group object;
process the first write request; and
in response to completing processing of the first write request, decrease the first reference count of the first redundancy group object.

12. The system of claim 11 wherein the storage I/O stack is further configured to:
in response to a failure of the first SSD,
create a copy of the first redundancy group object into a second redundancy group,
remove the storage device object referenced from the copy of the first redundancy group object to create a second redundancy group object having a second redundancy configuration different from the first redundancy configuration,
associate a second write request with the second redundancy group object; and
process the second write request using the second redundancy configuration.

13. The system of claim 12 wherein the storage I/O stack configured to process the first write request is further configured to:

in response to an error communicating with the first SSD, re-associate the first write request with the second redundancy group object, and re-process the first write request using the second redundancy configuration.

14. The system of claim 12 wherein each redundancy group is represented by a hierarchy of objects, and wherein the second redundancy group shares at least one object of its respective hierarchy of objects with the first redundancy group.

15. The system of claim 12 wherein the storage I/O stack is further configured to process the first and second write requests without fencing.

16. The system of claim 12 wherein the first redundancy group is represented by a first hierarchy of objects and the second redundancy group is represented by a second hierarchy of objects, wherein the objects include a child object having a second reference count indicating a number of pointers to one or more parent objects, and wherein the second reference count is incremented for one or more objects of the second hierarchy unaffected by the failure of the first SSD.

17. The system of claim 11 wherein each redundancy group is represented by a hierarchy of parent and child objects, each child object having a second reference count indicating a number of pointers to one or more parent objects.

18. The system of claim 17 wherein the storage I/O stack configured to process the first write request is further configured to:
store data of the first write request to the first SSD of the first redundancy configuration as a chunk represented by a chunk object, the chunk object included in the hierarchy of objects of the first redundancy group;
calculate redundant information based on the chunk; and
store the redundant information to a second SSD of the first redundancy configuration.

19. The system of claim 11 wherein the storage I/O stack configured to process the first write request is further configured to:
store the data in a segment across the set of SSDs of the first redundancy configuration, wherein the segment has a log-structured layout.

20. The system of claim 11 wherein the storage I/O stack is further configured to:
in response to the first reference count of the first redundancy group object reaching a sentinel value, delete the first redundancy group object.

* * * * *